Figure 1:
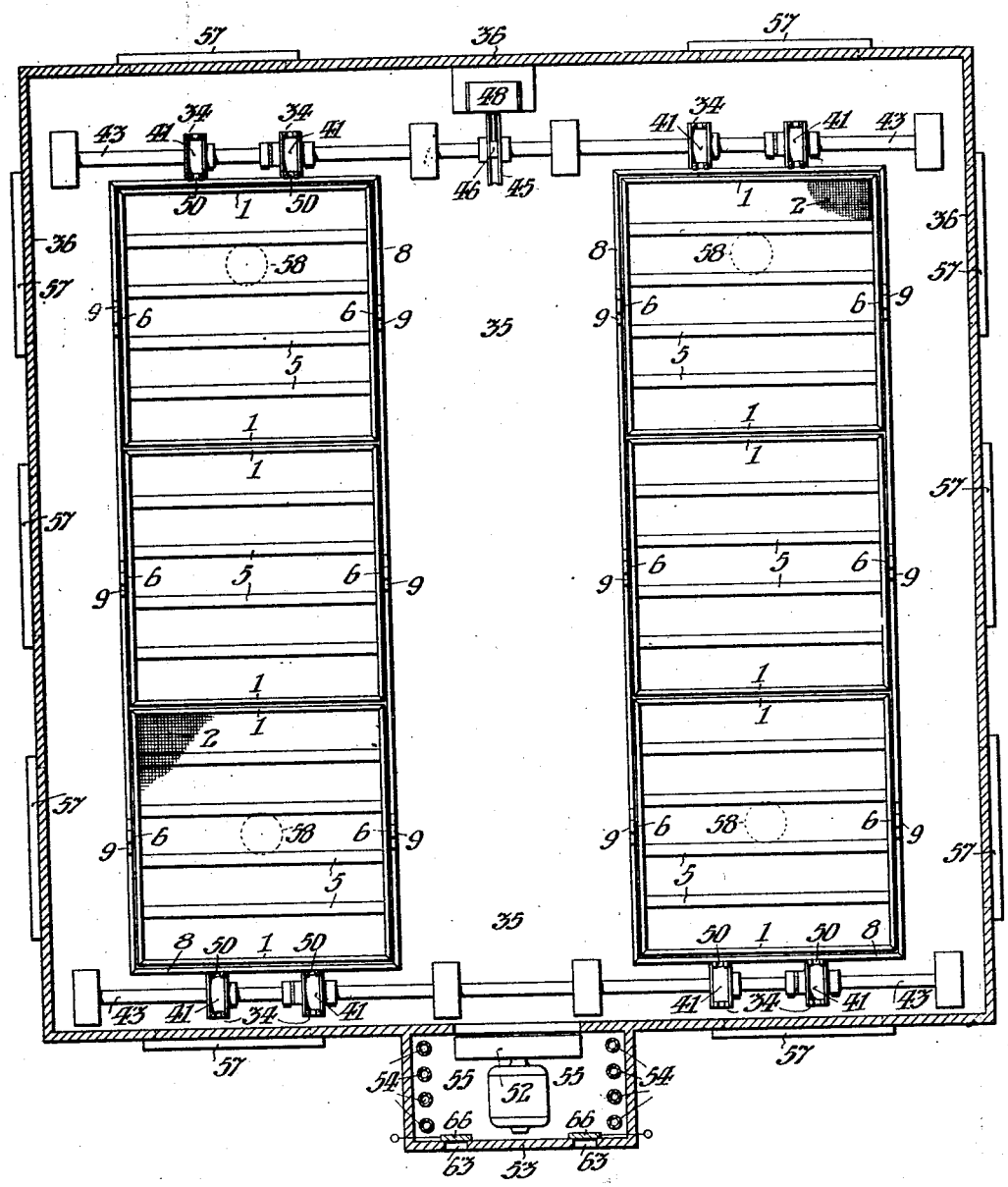

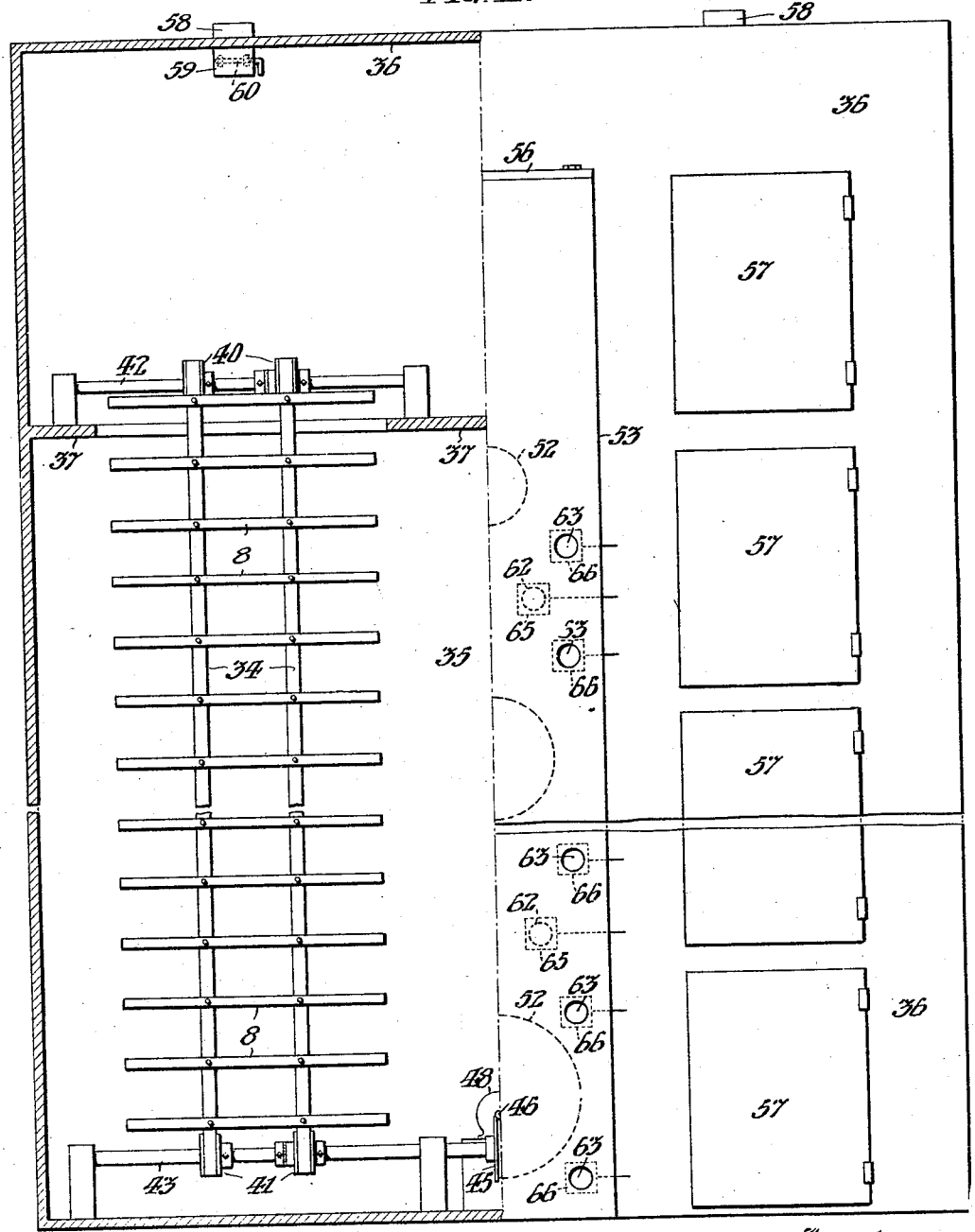

Feb. 17, 1931. W. F. HILLPOT 1,792,907
INCUBATOR
Filed Aug. 24, 1923 3 Sheets-Sheet 3
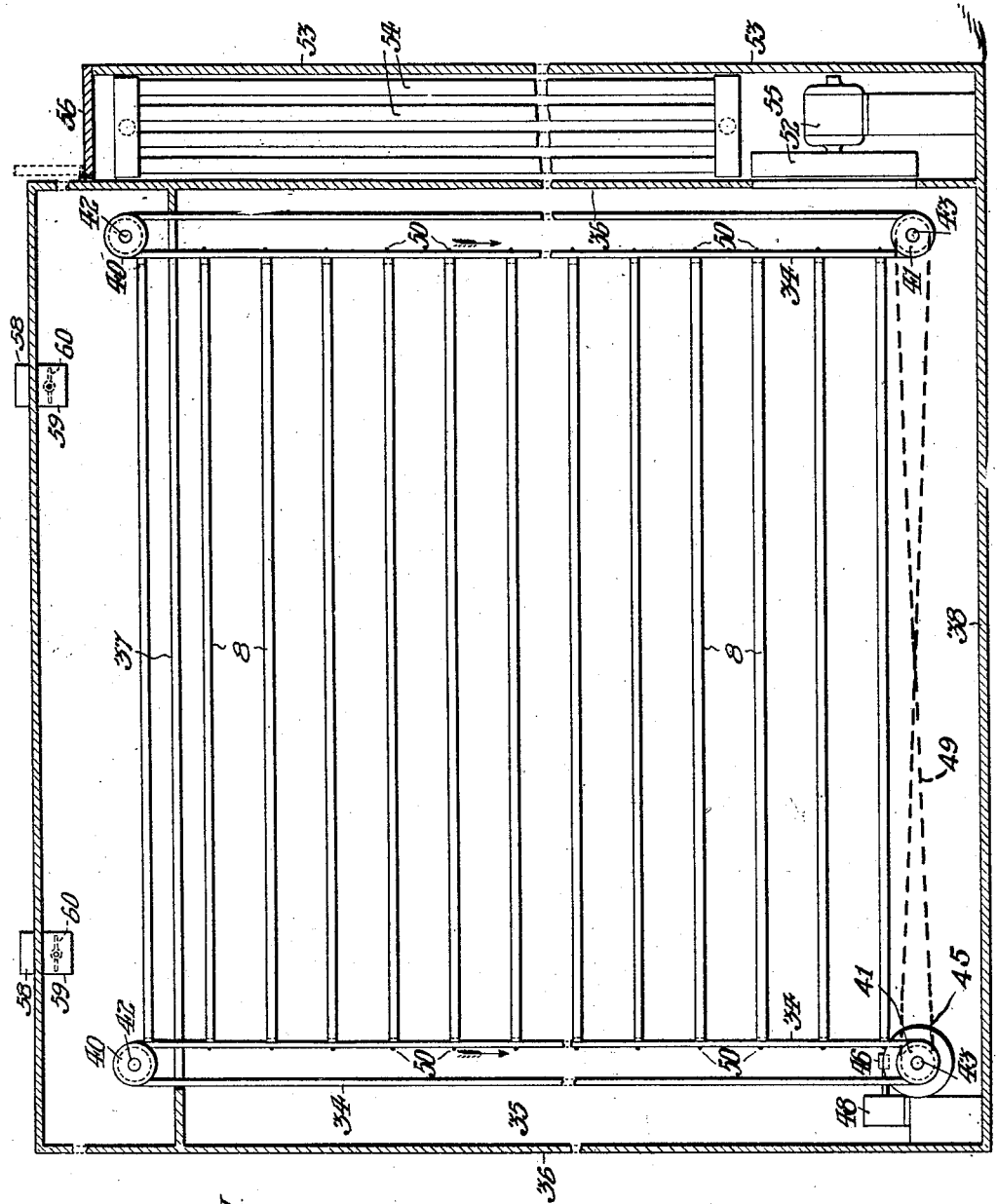
FIG. III
Inventor:
WILLIAM FINNEY HILLPOT, Patented Feb. 17, 1931

1,792,907

UNITED STATES PATENT OFFICE

WILLIAM FINNEY HILLPOT, OF FRENCHTOWN, NEW JERSEY

INCUBATOR

Application filed August 24, 1923. Serial No. 659,037.

It is the object of my invention to provide an inclosure for means for supporting eggs, during the period of incubation thereof, and including means for diffusing and circulating the air within said inclosure in such manner as to facilitate the incubation of the eggs inclosed.

As hereinafter described, I find it convenient to provide such egg supporting means including tiltable trays journaled in tiltable frames which are journaled in supporting flexible connectors which are conveniently endless chain belts, constructed and arranged in accordance with my invention disclosed in application Serial 577,499 for Letters Patent of the United States 1,489,597 granted April 8, 1924, and copending herewith. Such egg supporting means are so constructed and arranged as to progress the egg carrying trays and frames downwardly from the upper to the lower portion of the inclosure during each incubating operation thereof. It is generally understood that it is desirable to have eggs in an atmosphere which is warmer at the beginning of the incubating period than at the end thereof, for the reason that, at the beginning of said period, the eggs absorb heat but, as incubation proceeds, heat is generated to an increasing degree incident to changes taking place in the living contents of the eggs; the maximum permissible temperature being 100° F., which is approached at the end of the incubating period, and that it is not only desirable, but essential, to maintain the eggs in an atmosphere charged with a sufficient amount of oxygen to maintain the life processes within the eggs.

Of course, the natural convection currents in such an inclosure induce an upward movement of the air from the lower eggs of increasing temperature to the upper eggs of lower temperature, as the eggs are progressed downwardly as above described. However, I find it desirable to facilitate and augment such convection currents by a suitable motor, such as a rotary fan or blower and to locate such motor adjacent to the floor of said inclosure, in the side wall thereof, so as to direct a current of air horizontally with respect to said inclosure adjacent to the bottom thereof. Such air circulating means are operated at such a rate that all the eggs on the lowest trays will have air circulating around them at about the same speed. Moreover, I find it convenient to provide means for artificially heating the air when desired; such heating means being conveniently coils of pipe containing water or other heating medium exterior to said inclosure, in a conduit box leading to the fan or blower.

As hereinafter described, I do not desire to limit myself to the location of the air circulating motor or motors solely at the lower portion of the inclosures, as a plurality of fans, of different sizes, may be employed, respectively located at different heights in the inclosure. Moreover, although the interior of such inclosure may be ventilated to eliminate carbon dioxide by-products of the incubating processes by any convenient means; I find it convenient to provide such an inclosure with a ventilator opening or openings in the top thereof having means for hermetically closing such vent or vents but permitting the same to be opened at intervals at the will of the operator and in accordance with the varying conditions of the atmosphere within and without such inclosure.

My invention includes the various novel features of construction and arrangement hereinafter more definitely specified.

In said drawings; Fig. I is a diagrammatic plan view of an incubator inclosure embodying my invention.

Fig. II is a partly sectional elevation of the structure shown in Fig. I, as seen from the lower side of that figure.

Fig. III is a vertical sectional view of said structure shown in Figs. I and II, taken on the line III, III in Fig. I.

In said figures; the egg trays each comprise a rectangular, and conveniently square, marginal frame 1, which is open at the top and covered at the bottom with a web 2, preferably of foraminous material adapted to support the eggs 3 while permitting free circulation of air around them. Such a web is conveniently formed of insect screen wire, and is preferably reinforced and supported at intervals by the cross bars 5 which are rigidly connected at their opposite ends with the opposite side walls of said tray frame 1. Each of said trays is provided with trunnions 6 axially alined at the middle of each tray and projecting from opposite sides thereof, coincident with the axis of oscillation of the tray. Means supporting said trays 1 with their trunnions 6 extending horizontally, include holders or racks comprising respective rectangular parallelogram frames 8, conveniently formed of channel iron. Each of said holder racks 8 has bearings 9 at its opposite longitudinal sides, for the respective trunnions 6 of said trays; the arrangement being such that the axes of oscillation of said trays 1, coincident with their respective trunnions 6, are parallel with each other, as indicated in Fig. I.

Each of said holder racks 8 has means supporting it so that it may be tilted upon a horizontal axis of oscillation, in transverse relation to the axes of oscillation of the trays which it supports. That is to say; the freedom of movement of said trays 1 and racks 8 permits each tray to be tilted, so as to be inclined in either of two opposite directions, upon its individual axis, coincident with its trunnions 6, regardless of the position in which such axis is held by its rack 8, and the latter may be tilted, so as to be inclined in either of two opposite directions, regardless of the position in which the trays which it supports are tilted upon their individual axes; so that each tray may be inclined in at least four different positions with respect to the earth. I also find it convenient to provide detent means, to detain each tray in its position of adjustment, so as to prevent accidental displacement thereof, until it is desired to change its position, as above contemplated. However, such details of construction and arrangement are fully set forth in my copending application aforesaid, in which they are claimed.

Although each tray 1 may be thus independently adjusted and retained in any selected position of inclination; I find it desirable to operatively connect such trays in vertical series, so that any desired number of them may be tilted by one movement which is sufficient to tilt any one of them.

Each of the eggs 3 may be thus inclined, mechanically, in simulation of the movements naturally imparted to an incubating egg, by the mother bird, with the effect that the embryos are prevented from adhering to the lining membrances of the egg shells, as they do when the eggs are allowed to remain stationary. Moreover, such repeated movements of the eggs have a stimulating effect upon the development of the embryos, so that more of the latter survive than is the case when the eggs are allowed to remain stationary.

In the arrangement illustrated, a vertical series of such trays 1, mounted in a vertical series of racks 8, may be loaded with eggs 3 at such intervals that the operator can predetermine which tray contains the eggs which have reached the hatching stage.

In order to facilitate such operation of my invention as last above contemplated; I find it convenient to not only arrange the egg trays and their holder racks in vertical series, as indicated in Figs. II and III, but to so support such series that the trays may be progressed through an atmosphere, the temperature of which may be controlled to such a degree as to afford the maximum efficiency of hatching effect. For instance, such a vertical series of egg trays and holder frames may be detachably connected with and supported by endless chain belts 34 within a chamber 35 in which the temperature may be controlled by any suitable means. As indicated; said chamber is inclosed by the housing 36 including the platform or floor 37 at the upper level, where it is desired to charge the trays 1 with fresh eggs, and said trays 1 are caused to gradually descend, by movement of said chains 34, through said chamber 35, during the period of incubation, so that when the eggs reach the hatching stage, they are in the lowermost trays 1 in the vertical series of racks 8 and accessible from the lower platform or floor 38. Such an arrangement permits the trays and rack frames to be manually removed from the bottom of the vertical series aforesaid and recharged with fresh eggs, in succession, so that the incubating process is practically continuous.

Although all of the movements of the trays 1 and racks 8 above described may be effected manually; I find it convenient to effect such movements automatically. For instance, said chain belts 34 extend around sprocket wheels 40 and 41 which are respectively mounted upon shafts 42 and 43 at the top and bottom of said chamber 35 and said chains may be progressed by providing one shaft 43 with a worm gear 45 engaged by a worm 46 driven by the electric motor 48, and operatively connecting that shaft 43 with the other shaft 43, by any suitable means, for instance, a crossed belt, or a transversely extending shaft having bevel gear connections with said shafts 43. Such a belt is indicated by the dotted lines at 49 in Fig. III. In that arrangement, the racks 8 have studs 50 which extend through the links of said chain belts 34 in such relation thereto that they are automatically engaged and disengaged respectively at the top and bottom bights of said belts where they extend around said sprocket wheels. In that arrangement, the sprocket wheels upon one side of the racks 8 may be rigidly connected with their respective shafts, whereas, the sprocket wheels upon the other side of said racks 8 may be frictionally engaged with said respective shafts so that the belts upon one side of said racks 8 may be shifted relatively to the belts 34 upon the opposite side of said racks 8 to effect the tilting movements of said racks, as above described. As indicated in Figs. I and II the sprocket wheels 40 and 41 at the left hand side of the racks 8 are rigidly connected with their respective shafts 42 and 43 by set screws, whereas the sprocket wheels 40 and 41 at the right hand side of said racks 8 have no set screws in their hubs but are held between respective pairs of collars which are rigidly connected with the shafts 42 and 43 by set screws and frictionally engage the ends of the wheel hubs by washers which are stippled in said figures, and which may be formed of leather or other material affording the desired degree of friction. I find it convenient to effect such tilting movements so as to change the position of the eggs at intervals of six hours, although, of course, such changes may be effected at any desired intervals.

Of course, in such a structure, the atmosphere in the chamber 35 can be maintained at any suitable temperature in every part, by any suitable means. However, I find it convenient to provide an air motor or motors 52 which may be a rotary fan having its axis of rotation horizontal. Said fan 52 draws the air into said chamber 35 through the conduit box 53 which extends vertically parallel with the adjacent wall of said housing 36 surrounding said chamber and I find it convenient to provide means to heat the air thus supplied to said chamber 35, by extending coils of pipes 54 in said conduit box 53 to receive heated water, steam, or other convenient heating medium; when it is desired, to heat the air in the induction chamber 55. Said fan is so constructed and arranged, and operated at such speed, that all of the eggs in the lowest trays will have air circulating around them at about the same speed.

Although I have found it possible to adequately diffuse and circulate the air in such chamber 35 by means of a single fan motor 52 in the lower part of said chamber; I may employ a series of such fans at different heights in said chamber and of suitable sizes. For instance, the lowermost fan may be sixteen inches in diameter, the next higher twelve inches and the upper one eight inches in diameter, and it is to be understood that said fans may be rotated in either direction to circulate the air in said chamber either toward or away from said conduit. For instance, said conduit 53 may be closed at the top by the flat 56, and the air diffused and circulated throughout said chamber 35, by way of said conduit, in a closed system, by rotating the fans 52 at different levels in opposite directions and ventilating said chamber 35, when and to whatever extent desired, by opening the doors 57 in the wall of said housing 36. However, I prefer to provide said chamber with ventilators 58 including cylindrical pipes, for instance, ordinary stove pipes 59, at the top thereof, provided with rotary ventilator closures 60 which may be tilted to open and close any one of said vents to any desired degree to effect the desired diffusion and circulation of the air in said egg chamber 35 and ventilation of the latter.

Moreover, I find it convenient to provide said conduit box 53 with a series of ports 62 and 63 opening from said induction chamber 55 respectively into the egg chamber 35 and to the outer atmosphere, and to provide such ports with respective closures, for instance, slides 65 and 66 whereby the effective area of said ports may be adjustably varied from maximum to zero.

Of course, it is to be understood that said ventilator closures 60 may be adjusted to vary the effective area of the vents which they control and be left in adjusted position to circulate air from said induction chamber 55 when said flap 56 is open, to and through said egg chamber 35 and out said ventilators.

It may be observed that, in the arrangement described wherein the egg supports are automatically movable by means of the endless conveyor belts described to gradually progress the eggs from the top to the bottom of the egg chamber 35 during the process of incubation; the location of the air moving means at the lower portion of said chamber 35 causes the air to move with greater velocity there than in the upper regions and, consequently, subjects the eggs to a more rapid circulation of air in accordance with the progression of the incubating operation. In other words; such construction and arrangement subject the eggs to a gradually increasing cooling effect in the latter stages of the incubating operation and thus effect an increasing interchange of temperature between the eggs and the atmosphere adjacent thereto as the process of incubation proceeds.

In view of incubators of the prior art in which the temperature of the air introduced to the egg chamber is controlled by thermostatic means responsive to the temperature of the air in the egg chamber; it is to be particularly noted that the construction and arrangement of my invention above described provides means arranged to control the temperature of the air in the induction chamber 55, and consequently the temperature of the air at its introduction to the egg chamber, independently of the temperature in said egg chamber; such means including ports opening from said induction chamber to said egg chamber and to the outer atmosphere and movable closures for said ports and means, in the conduit box 53, arranged to heat the air passing to the fan 52.

Although I have found it convenient, in the structure illustrated, to extend the air conduit box 53 vertically, in connection with a side wall of the egg chamber 35; it is to be understood that it may be otherwise located and arranged. Furthermore although I have found it convenient to gradually progress the eggs from one region to another in the egg chamber 35 as the incubating process proceeds; of course, such change of location of the eggs may be effected intermittently, step by step; for instance, by alternately starting and stopping the egg moving means described. However, I do not desire to limit myself to such egg moving means, as any suitable means may be employed to shift the eggs, in combination with means to forcibly progress suitably heated air at different rates in different regions of the egg chamber; provided that such egg moving and ventilating means are so coordinated that the eggs are subjected to a more rapid circulation of air in correspondence with the progression of the incubating operation, to thus attain the desired effect above contemplated, to wit, to subject the eggs to a gradually increasing cooling effect in the latter stages of the incubating operation in compensation for the natural increase of temperature of the eggs by the life process therein, to not only prevent overheating and consequent destruction of the life germs but to supply the latter with the increasing volume of oxygen which is necessary for their maintenance during such latter stages.

It is characteristic of the incubators chosen for exemplification of my invention as above described, that the egg chamber is devoid of such partitions as are used in the prior art to compel the circulation of air in predetermined paths with respect to the eggs; for instance, there are numerous prior art incubators wherein there are partitions at opposite sides of a corridor which confine the air driven from a fan to a path between said partitions and, in conformity with relevant decisions I use the term "general agitation" to describe the movement of the air which is effected in incubator structures such as defined in the following claims, which are devoid of such partitions.

Therefore, I do not desire to limit myself to the precise details of construction and arrangement herein set forth as it is obvious that various modifications may be made therein, without departing from the essential features of my invention, as defined in the appended claims.

I claim:

1. In an incubator, the combination with an inclosure for an egg chamber; of means arranged to support egg trays in vertical tiers in said chamber including endless belts, adapted for detachable connection with said trays; whereby the eggs may be progressed vertically by said belts, to different regions in said inclosure, in accordance with the stage of their incubation; means arranged to circulate air in said egg chamber, including a fan exterior to said egg chamber, and means arranged to direct a current of air from said fan horizontally into said egg chamber; a conduit box exterior to said egg chamber, covering said fan and forming an air induction chamber; means arranged to control the temperature of the air in said induction chamber independently of the temperature in said egg chamber, including ports opening from said induction chamber to said egg chamber and to the outer atmosphere, and movable closures for said ports; and means, in said conduit box, arranged to heat the air passing to said fan; whereby, the air in the egg chamber is continually circulated in horizontal strata between the egg trays and at different velocity in respective strata between said trays and the eggs in the trays are subjected to air of increasing velocity in accordance with their progression in incubation and thus subjected to progressive increment of cooling effect and supply of oxygen required during successive stages of incubation.

2. In an incubator as in claim 1; means arranged to progress said trays downwardly, by said belts; and means adapted to temporarily support an egg tray, at the upper parts of said belts, arranged to facilitate the initial placement and connection of such trays on said belts.

3. An incubator as in claim 1; wherein the ports opening from said induction chamber to said egg chamber are at respectively different levels in the latter.

4. In an incubator, the combination with an inclosure for an egg chamber; of means arranged to support egg trays in vertical tiers in said chamber; whereby the eggs may be progressed to different levels in said inclosure in accordance with the stage of their incubation; means arranged to circulate air in said egg chamber, including a fan mounted to rotate upon a horizontal axis exterior to said egg chamber and means arranged to direct a current of air from said fan horizontally into said egg chamber; means forming an air induction chamber leading to said fan; means arranged to control the temperature of the air in said induction chamber, independently of the temperature in said egg chamber; and means, in said induction chamber, arranged to heat atmospheric air before it reaches said fan; whereby, the air in the egg chamber is continually circulated in horizontal strata between the egg trays and at different velocity in respective strata between said trays and the eggs in the trays are subjected to air of increasing velocity in accordance with their progression in incubation, and thus subjected to progressive increment of cooling effect and supply of oxygen required during successive stages of incubation.

5. In an incubator the combination with an inclosure for an egg chamber; of means arranged to support egg trays in vertical tiers in said chamber, including endless belts; whereby the eggs may be progressed to different levels in said inclosure in accordance with the stage of their incubation; a conduit box exterior to said egg chamber, and forming an air induction chamber; air heating means in said induction chamber; means arranged to control the temperature of the air in said induction chamber, independently of the temperature in said egg chamber, including ports opening from said induction chamber to said egg chamber and to the outer atmosphere, and movable closures for said ports; and means, arranged to forcibly inject the air from said induction chamber to said egg chamber, at the lower portion of the latter; an air vent at the upper portion of said egg chamber; and an adjustable closure for said vent; whereby the circulation of air in said egg chamber may be varied.

6. In an incubator the combination with an inclosure for an egg chamber; of means arranged to support egg trays in vertical tiers in said chamber and permit free passage of air horizontally between said trays throughout said tiers; means arranged to forcibly circulate air in horizontal strata between said trays and at different velocities in the respective strata; and means whereby said trays may be progressively moved and thereby subjected to strata of air of increasing velocity, with corresponding increment in the cooling and oxygenating effect of the air upon the eggs as the incubation proceeds.

7. An incubator as in claim 6 wherein the means for moving the trays include endless chains at opposite ends of the trays and detachably connected therewith; and means arranged to progress said chains and trays from the region of introduction of the fresh eggs to the region of discharge of the hatched chicks.

8. In an incubator, the combination with an inclosure for an egg chamber; of means arranged to circulate air in horizontal strata in said chamber, between congeries of eggs and to effect general agitation of air in said chamber, including a fan mounted to rotate upon a horizontal axis at a vertical wall of said chamber, a conduit covering said fan and forming an air induction chamber; ports opening from the outer atmosphere to said induction chamber and from said egg chamber to said induction chamber; movable closures for said ports, whereby the effective area of said ports leading from said induction chamber to said air chamber may be varied; and means, in said conduit, arranged to heat the air in its passage from the outer atmosphere to said egg chamber and in its recirculation from said egg chamber to said fan; and belt means adapted to vertically shift eggs in said chamber, during such agitation of the air in said chamber.

In testimony whereof, I have hereunto signed my name at Philadelphia, Pennsylvania, this seventeenth day of August, 1923.

WILLIAM FINNEY HILLPOT.